Patented Dec. 11, 1934

1,984,283

UNITED STATES PATENT OFFICE 1,984,283

ESTER OF POLYCARBOXYLIC ACIDS

Ebenezer Emmet Reid, Baltimore, Md., and George L. Schwartz, Wilmington, Del., assignors to E. I. du Pont de Nemours & Company, Wilmington, Del., a corporation of Delaware No Drawing. Application February 5, 1931, Serial No. 513,778

11 Claims. (Cl. 260—103)

This invention relates to compositions containing an aryl alkyl or aryl aryl ester of a polycarboxylic acid and, more particularly, cellulose ester compositions, and still more particularly, cellulose ester compositions containing benzyl ethyl phthalate.

In the practical application of dissolved cellulose and soluble cellulose compounds, including cellulose esters, to the various arts and manufacture, such as the production of films, varnishes, filaments, plastic masses, etc., it is customary to blend or mix or otherwise add to the cellulose ester, or to its solution, certain non-cellulosic materials commonly termed softeners, camphor substitutes or the like, such additions being made for the purpose of imparting to the cellulose or its compounds some desired properties, such as non-inflammability, plasticity under heat, flexibility, etc. These softeners, camphor substitutes and the like, which we shall hereinafter for convenience designate as "modifiers", function in many different ways in cellulosic combinations; and the properties which they impart to the product depend upon and are determined by both the physical and the chemical properties of the particular modifier used. For example, if a modifier is non-inflammable, it will impart this property to the cellulose to a degree which is of course dependent upon the character of the modifier and the proportion added; if the modifier is relatively non-volatile its effect will be more permanent than that of a more volatile modifier; if the modifier is a solvent under suitable conditions for the cellulose material, it will as a rule impart greater flexibility than if it is a non-solvent; and particularly, modifiers which are liquid at normal temperatures will, other things being equal, impart greater flexibility than those which are solid at normal temperatures.

This invention therefore comprises the use of mixed esters having extremely low volatility and a low freezing range as modifiers for cellulose esters. Cellulose nitrate compositions modified with these esters are pliable, extremely tough, and stable to heat and light. These esters can be used in proportions to cellulose nitrate that cover a range wide enough to produce hard, tough films with good flexibility but low stretch, and soft pliable films with high stretch without lowering the transparency and homogeneity of the product. The products are not influenced much by temperature variations and are not brittle when cold. The esters do not exude from the surface at high temperatures or crystallize on the surface at low temperatures. This is accomplished by a selection of two or more alcohols that, when combined in the same chemical compound, give low melting compounds. Or, as stated otherwise, by the use of an aryl alcohol to neutralize one carboxyl group and an alkyl alcohol to neutralize another carboxyl group of a polycarboxylic acid, compounds are obtained that have greater temperature spans between their melting points and boiling points than when only one alcohol is used. When acids are used that contain more than two carboxyl groups the introduction of a third or fourth alcohol can be accomplished sometimes with beneficial results.

The esters that we have found more suitable as modifiers than most substances heretofore proposed for this purpose include the aryl alkyl esters of phthalic, tartaric, and citric acids. We are not limited, however, to these esters and may form mixed esters by various combinations of alcohols, such as:

Phenol, $C_6H_5OH$,
Benzyl alcohol, $C_6H_5CH_2OH$,
Tolyl (xylyl) alcohol, $CH_3C_6H_4CH_2OH$,
Beta phenyl-ethyl alcohol, $C_6H_5CH_2CH_2OH$,
Phenyl-methyl alcohol, $C_6H_5CHOH-CH_3$,
Cinnamyl alcohol, $C_6H_5CH=CH-CH_2OH$,
Cresol, $CH_3C_6H_4OH$,
Methyl alcohol, $CH_3OH$,
Ethyl alcohol, $C_2H_5OH$,
Propyl alcohol, $C_3H_7OH$,
Butyl alcohol, $C_4H_9OH$,
Amyl alcohol, $C_5H_{11}OH$, with various acids, such as:

Phthalic, $C_6H_4(COOH)_2$,
Dihydroxy terephthalic, $C_6H_2(OH)_2(COOH)_2$,
Phenyl malonic, $COOH-CH(C_6H_5).COOH$,
Tartaric, $COOH-CHOH-CHOH-COOH$,
Pyromellitic, $C_6H_2(COOH)_4$,
Citric, $COOH-CH_2-C(OH)(COOH)-CH_2-COOH$,

Benzyl butyl phthalate

In the manufacture of the above compounds the method of preparation disclosed in the patent to Reid No. 1,554,033, dated September 15, 1925, may be followed, but we prefer to produce them as illustrated by the following example of a method which gives a mixed product that consists almost entirely of benzyl butyl phthalate with small amounts of dibutyl phthalate and dibenzyl phthalate. It consists of the catalytic alcoholysis of dibutyl phthalate by benzyl alcohol in the presence of sodium benzylate. This is an equilibrium reaction in which advantage is taken of the lower boiling point of butyl alcohol to remove it by distillation as rapidly as it is formed with the result that the reaction proceeds practically to completion as indicated by the following equation:

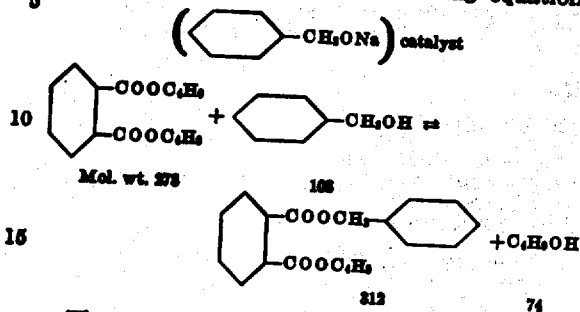

The dibutyl phthalate may contain upwards of 5% butyl alcohol but no esters of lower boiling point than dibutyl phthalate, and it should be anhydrous. The benzyl alcohol may be any colorless technical grade that shows a low chlorine content and has a distillation range between 200 and 220° C.

The following weights of materials are used for the preparation:

| | Pounds |
|---|---|
| Dibutyl phthalate | 96.8 |
| Benzyl alcohol | 38.0 |
| Metallic sodium | 0.5 |

The benzyl alcohol is charged into a cast iron still and brought to a boil under a reduced pressure to remove the water. To this alcohol the metallic sodium is added in small pieces while the liquid is held at 50° C. When the reaction is complete the dibutyl phthalate is added to the still and the pressure is reduced to about 20 mm. of mercury while it is rapidly heated to 60° C. when the butyl alcohol begins to distil. The temperature is gradually raised to 115° C. and when no more butyl alcohol distils over the reaction is complete. The recovery of butyl alcohol is very near the theoretical. After cooling, the product is washed free of the sodium salt and is dehydrated by heating at 100° C. under reduced pressure.

The finished product is a neutral, clear, light yellow or brown oil that is free of sediment. It possesses a faint odor of benzyl alcohol. The ester content calculated as benzyl butyl phthalate is about 98%.

Benzyl butyl phthalate is chemically inert in its action on a pyroxylin film. It can be used with very active pigments such as zinc oxide without causing undue deterioration of the pyroxylin such as is common with castor oil which causes a pyroxylin film containing zinc oxide to become brittle in a few weeks at 65° C. It is a good solvent for pyroxylin and is miscible in all proportions with the common volatile solvents and diluents. Its color, odor, low volatility, chemical stability and solvent powers make it especially desirable for pyralin or lacquers.

For this purpose it can be used with pyroxylin of 12.0% nitrogen content in ratios by weight that may be between pyroxylin 1.00—benzyl butyl phthalate 0.40 to pyroxylin 1.00—benzyl butyl phthalate 1.75. When it is mixed with pyroxylin 1.00—benzyl butyl phthalate 1.25 the film is tough and very pliable. In hard lacquers and pyralin the ratio of benzyl butyl phthalate must be lower. For artificial leather coatings the ingredients might be used in the following amounts, as an example:

| | Parts by weight |
|---|---|
| Pyroxylin 12.05% nitrogen | 1.00 |
| Dry pigment | 0.62 |
| Benzyl butyl phthalate | 1.60 |
| Volatile solvent | ---- |
| | 7.00 |

The lower limits of benzyl butyl phthalate in a pigmented mixture of this kind are about 1.00 parts and the upper limits are about 2.20 parts depending on the pliability desired.

Benzyl butyl phthalate can be used in combination with other softeners such as castor oil for the purpose of reducing the cost or the solvent power of the mixture.

Although the neutral phthalates of any one of the various isomeric butyl alcohols may be used as a starting material in the production of the benzyl butyl phthalates, as illustrated in the above example, we prefer to use the neutral phthalate of normal primary butyl alcohol.

The pigments and solvents used in these compositions may be the usual ones or any desired combinations and, as indicated above, dibenzyl phthalate may be present with the benzyl butyl phthalate in the cellulose derivative composition.

Benzyl butyl tartrate

When it is desired to utilize benzyl alkyl esters of tartaric acid, these may be made in the manner clearly described in detail for the manufacture of benzyl butyl phthalate, the only change necessary being in the use of the proper proportions of the ingredients, which in turn depends on their relative molecular weights. Using dibutyl tartrate and benzyl alcohol to produce benzyl butyl tartrate, with sodium benzylate catalyst, the reaction proceeds practically to completion as indicated by the following equation:

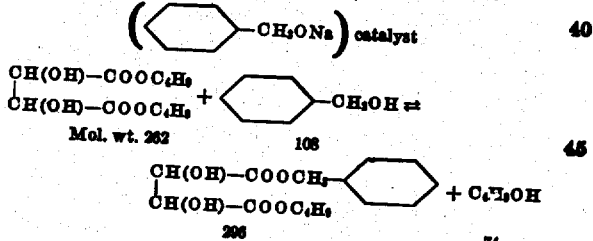

The following weights of materials are used for the preparation of benzyl butyl tartrate:

| | Pounds |
|---|---|
| Dibutyl tartrate | 91.2 |
| Benzyl alcohol | 38 |
| Metallic sodium | .5 |

Benzyl ethyl phthalate

One hundred and eight grams (1 mol) of benzyl alcohol (commercial grade showing only a small amount of halogen by Beilstein test) was placed in a one liter distilling flask. The flask was evacuated to about 30 mm. of mercury pressure and the alcohol was brought to a boil to remove the water. When the alcohol was cooled to 50° C. 1.3 g. (.056 mol) of sodium was added and after the sodium was completely dissolved 222 g. (2 mols) of diethyl phthalate was added. The diethyl phthalate had been dehydrated by vacuum distillation and the fraction boiling at 105–146° C. at 4 mm. mercury was selected for use. The mixture was then heated on a water bath at 50–60° C. under a pressure of 50 mm. mercury for two hours.

The temperature was raised slowly to 85° while the pressure was decreased to 30 mm. mercury. At the end of this treatment 40 g. of ethyl alcohol was recovered, while the theoretical amount is 46 g. The final product was a clear lemon yellow viscous liquid which weighed 268 g., giving a yield of 91% of the theoretical amount. On fractionation of this material a clear lemon yellow viscous liquid was obtained that boiled at 195-200° C. under 3 mm. mercury pressure. This substance was benzyl ethyl phthalate.

Phenyl-ethyl ethyl phthalate

Exactly the same procedure was used to prepare phenyl-ethyl ethyl phthalate as was given for benzyl ethyl phthalate. The quantities were as follows:—

122 g. (1 mol) of beta phenyl-ethyl alcohol
1.3 g. (.056 mol) sodium metal
222 g. (1 mol) diethyl phthalate The substances were treated and mixed in the same manner as just described and were heated for six hours. At the end of this period the mixture had the appearance of apple sauce. The alcohol that was collected weighed 42 g. against the theoretical recovery of 46 g. After washing with water and drying in vacuum at 100° C. the product was a light lemon yellow transparent oil. The yield was 272 g. or 91% of the theoretical. This product was fractionated under a mercury pressure of 2 mm. and a transparent lemon yellow oil was obtained that boiled at 200-210° C. under this pressure. This product was phenyl-ethyl ethyl phthalate.

Phenyl-ethyl diethyl citrate

The same procedure was used to prepare phenyl-ethyl diethyl citrate, using sodium phenyl-ethylate as a catalyst:

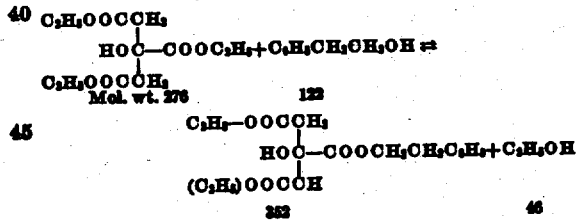

The following weights are used for the preparation:

| | Pounds |
|---|---|
| Triethyl citrate | 96.1 |
| Phenyl-ethyl alcohol | 42.9 |
| Metallic sodium | 0.5 |
| Mols ethyl alcohol displaced | 1. |

The phenyl-ethyl alcohol is charged into a cast iron still and brought to a boil under reduced pressure to remove water. To this alcohol the metallic sodium is added in small pieces while the liquid is held at 50° C. When the reaction is complete the triethyl citrate is added to the still and the pressure is reduced to about 20 mm. of mercury while it is rapidly heated to 60° C. When the ethyl alcohol begins to distil over the temperature is gradually raised to 115° C. and when no more ethyl alcohol distils over the reaction is complete. The recovery of ethyl alcohol is very near the theoretical. The product after cooling is washed free of sodium salt and is then dehydrated by heating at 100° C. under reduced pressure.

If two mols of the phenyl-ethyl alcohol are added, two ethyl groups are removed and two mols of ethyl alcohol are displaced, forming di(phenyl-ethyl) ethyl citrate, instead of monophenyl-ethyl diethyl citrate as above.

Furthermore, where desired, one mol of butyl alcohol and one mol of phenyl-ethyl alcohol can be added at the same time and two mols of ethyl alcohol are displaced with the formation of an ester which contains an ethyl, a butyl, and a phenyl-ethyl group.

By substituting mol weights of the various alcohols herein listed, and other alcohols of these types, a large list of other esters is prepared that are excellent modifiers of cellulose nitrate. Some of these substances are:

Benzyl methyl phthalate
Benzyl ethyl dihydroxy terephthalate
Benzyl ethyl phenyl-malonate
Benzyl ethyl tartrate
Benzyl ethyl succinate
Benzyl ethyl citrate
Benzyl ethyl pyromellitate
Phenyl-ethyl cresyl phthalate
Cinnamyl ethyl phthalate
Phenyl-methyl ethyl phthalate
Benzyl tolyl (xylyl) phthalate As indicated above, we prefer to produce these modifiers by the catalytic alcoholysis of the simple neutral esters with one of the alcohols that is to be added to the final product in the presence of the sodium alcoholate of the higher boiling alcohol which is to be introduced although direct esterification is in some cases practicable. In this manner the primary esterification to neutralization of the acid is accomplished with one alcohol, usually the lower boiling alcohol. One or more of these alcoholic groups is then removed by the second reaction, which is the alcoholysis reaction, by controlling the amount of the higher boiling alcohol that is added to the reaction mixture. This in an equilibrium reaction in which advantage is taken of the lower boiling alcohol, which has been used to neutralize the acid, to remove it by distillation as rapidly as it is formed with the result that the reaction proceeds practically to completion. This method of introducing a high boiling alcohol into a compound has certain advantages such as the greater purity of the products obtained, lower temperature of reaction, and ease with which this type of esterification occurs, especially with the higher alcohols. This conversion at low temperatures is of special importance with the higher alcohols, such as benzyl and tolyl alcohols which are readily converted to the ethers at temperatures required for direct esterification in the presence of a catalyst, such as sulfuric acid.

The catalyst for the alcoholysis reaction is formed by adding one mol of sodium metal to one mol of the anhydrous alcohol, and preferably heating to facilitate the reaction, but controlling the temperature so it does not exceed 50° C. The high boiling alcohols are readily obtained in the anhydrous form by simple distillation of a foreshot which contains all of the water. In the same manner the neutral ester of the lower boiling alcohol is dehydrated. Anhydrous conditions are essential for high yields but the method of dehydrating the reagents as shown is relatively simple and also economical.

We prefer to use these products in the washed, undistilled condition as modifiers for cellulose nitrates, although for certain special uses the fractionated products may be used with advantage.

These modifiers of cellulose nitrate are used chiefly with cellulose nitrate containing 8.7% nitrogen to 12.0% nitrogen and are especially useful in lacquers.

The term "aryl" is used herein to designate any group that contains an aromatic group (except completely hydrogenated aromatic groups) such as phenyl, benzyl or phthalate. Some authorities, however, use the term "aryl-alkyl" to designate products containing a benzyl group which is formed by the substitution of a phenyl group for a hydrogen of an alkyl group. In order that the terminology of the present application may be flexible enough to coincide with both types of terminology, applicants wish their use of such terms as "aryl" and "aryl-alkyl" to be interchangeable where necessary so that their terminology may coincide with that used by others in referring to the same materials.

The use of the mixed esters disclosed herein is not limted to cellulose nitrate compositons as they are also useful in connection with other cellulose derivatives, such as cellulose acetate and ethyl cellulose.

This application is in part a continuation of our application Serial No. 41,409, filed July 3, 1925, for "Softeners for pyroxylins", in which cellulose ester compositions containing benzyl butyl phthalate are claimed specifically.

As many apparently widely different embodiments of this invention may be made without departing from the spirit and scope thereof, it is to be understood that we do not limit ourselves to the specific embodiments thereof except as defined in the appended patent claims.

We claim:

1. A composition of matter comprising a hydrocarbon aryl ethyl mixed ester of a polycarboxlic acid which contains no unsaturated alkyl group.

2. A composition of matter comprising a hydrocarbon aryl ethyl mixed ester of a dicarboxylic acid which contains no unsaturated alkyl group.

3. A composition of matter comprising a hydrocarbon aryl ethyl mixed ester of a dicarboxylic aromatic acid.

4. A composition of matter comprising a hydrocarbon aryl ethyl mixed ester of phthalic acid.

5. A composition of matter comprising benzyl ethyl ortho-phthalate.

6. A composition of matter comprising a hydrocarbon aryl ethyl mixed ortho-phthalate.

7. Benzyl ethyl ortho-phthalate having a boiling point of 199° C. under an absolute pressure of approximately 3 mm. of mercury.

8. A composition of matter comprising a hydrocarbon aryl mixed ester of a polycarboxylic acid which contains no unsaturated alkyl group, said hydrocarbon aryl mixed ester being selected from the group which consists of aryl ethyl, aryl tolyl and aryl amyl esters.

9. A composition of matter comprising a hydrocarbon aryl mixed ester of phthalic acid, said hydrocarbon aryl mixed ester being selected from the group which consists of aryl ethyl, aryl tolyl and aryl amyl esters.

10. A composition of matter comprising benzyl tolyl phthalate.

11. A composition of matter comprising benzyl amyl phthalate.

EBENEZER EMMET REID.
GEORGE L. SCHWARTZ.

---

Certificate of Correction

Patent No. 1,984,283.   December 11, 1934.

EBENEZER EMMET REID ET AL.

It is hereby certified that errors appear in the printed specification of the above numbered patent requiring correction as follows: Page 1, second column, line 37, for the period before "COOH" second occurrence insert a *dash*; page 3, first column, line 48, strike out last line of formula and insert instead $(C_2H_5)OOCCH_2$; and page 4, second column, line 2, claim 1, for the syllable "boxlic" read *boxylic*; and that the said Letters Patent should be read with these corrections therein that the same may conform to the record of the case in the Patent Office.

Signed and sealed this 5th day of March, A. D. 1935.

LESLIE FRAZER,
*Acting Commissioner of Patents.* chiefly with cellulose nitrate containing 8.7% nitrogen to 12.0% nitrogen and are especially useful in lacquers.

The term "aryl" is used herein to designate any group that contains an aromatic group (except completely hydrogenated aromatic groups) such as phenyl, benzyl or phthalate. Some authorities, however, use the term "aryl-alkyl" to designate products containing a benzyl group which is formed by the substitution of a phenyl group for a hydrogen of an alkyl group. In order that the terminology of the present application may be flexible enough to coincide with both types of terminology, applicants wish their use of such terms as "aryl" and "aryl-alkyl" to be interchangeable where necessary so that their terminology may coincide with that used by others in referring to the same materials.

The use of the mixed esters disclosed herein is not limited to cellulose nitrate compositons as they are also useful in connection with other cellulose derivatives, such as cellulose acetate and ethyl cellulose.

This application is in part a continuation of our application Serial No. 41,409, filed July 3, 1925, for "Softeners for pyroxylins", in which cellulose ester compositions containing benzyl butyl phthalate are claimed specifically.

As many apparently widely different embodiments of this invention may be made without departing from the spirit and scope thereof, it is to be understood that we do not limit ourselves to the specific embodiments thereof except as defined in the appended patent claims.

We claim:

1. A composition of matter comprising a hydrocarbon aryl ethyl mixed ester of a polycarboxlic acid which contains no unsaturated alkyl group.

2. A composition of matter comprising a hydrocarbon aryl ethyl mixed ester of a dicarboxylic acid which contains no unsaturated alkyl group.

3. A composition of matter comprising a hydrocarbon aryl ethyl mixed ester of a dicarboxylic aromatic acid.

4. A composition of matter comprising a hydrocarbon aryl ethyl mixed ester of phthalic acid.

5. A composition of matter comprising benzyl ethyl ortho-phthalate.

6. A composition of matter comprising a hydrocarbon aryl ethyl mixed ortho-phthalate.

7. Benzyl ethyl ortho-phthalate having a boiling point of 199° C. under an absolute pressure of approximately 3 mm. of mercury.

8. A composition of matter comprising a hydrocarbon aryl mixed ester of a polycarboxylic acid which contains no unsaturated alkyl group, said hydrocarbon aryl mixed ester being selected from the group which consists of aryl ethyl, aryl tolyl and aryl amyl esters.

9. A composition of matter comprising a hydrocarbon aryl mixed ester of phthalic acid, said hydrocarbon aryl mixed ester being selected from the group which consists of aryl ethyl, aryl tolyl and aryl amyl esters.

10. A composition of matter comprising benzyl tolyl phthalate.

11. A composition of matter comprising benzyl amyl phthalate.

EBENEZER EMMET REID.
GEORGE L. SCHWARTZ.

Certificate of Correction

Patent No. 1,984,283.   December 11, 1934.

EBENEZER EMMET REID ET AL.

It is hereby certified that errors appear in the printed specification of the above numbered patent requiring correction as follows: Page 1, second column, line 37, for the period before "COOH" second occurrence insert a *dash*; page 3, first column, line 48, strike out last line of formula and insert instead $(C_2H_5)OOCCH_2$; and page 4, second column, line 2, claim 1, for the syllable "boxlic" read *boxylic*; and that the said Letters Patent should be read with these corrections therein that the same may conform to the record of the case in the Patent Office.

Signed and sealed this 5th day of March, A. D. 1935.

LESLIE FRAZER,
*Acting Commissioner of Patents.*